(12) United States Patent
Seimasa

(10) Patent No.: US 11,609,957 B2
(45) Date of Patent: Mar. 21, 2023

(54) DOCUMENT PROCESSING DEVICE, METHOD OF CONTROLLING DOCUMENT PROCESSING DEVICE, AND NON-TRANSITORY COMPUTER-READABLE RECORDING MEDIUM CONTAINING CONTROL PROGRAM

(71) Applicant: FRONTEO, Inc., Tokyo (JP)

(72) Inventor: Takafumi Seimasa, Tokyo (JP)

(73) Assignee: FRONTEO Inc., Tokyo (JP)

( * ) Notice: Subject to any disclaimer, the term of this patent is extended or adjusted under 35 U.S.C. 154(b) by 132 days.

(21) Appl. No.: 17/094,907

(22) Filed: Nov. 11, 2020

(65) Prior Publication Data

US 2021/0141841 A1    May 13, 2021

(30) Foreign Application Priority Data

Nov. 13, 2019    (JP) .............................. JP2019-205267

(51) Int. Cl.
  *G06F 16/93*    (2019.01)
  *G06F 16/9035*    (2019.01)
  *G06F 16/901*    (2019.01)
  *G06F 16/906*    (2019.01)

(52) U.S. Cl.
  CPC ............ *G06F 16/93* (2019.01); *G06F 16/906* (2019.01); *G06F 16/9014* (2019.01); *G06F 16/9035* (2019.01)

(58) Field of Classification Search
  CPC .. G06F 16/93; G06F 16/9035; G06F 16/9014; G06F 16/906
  USPC ........................................................ 707/769
  See application file for complete search history.

(56) References Cited

U.S. PATENT DOCUMENTS

| | | | | |
|---|---|---|---|---|
| 8,549,014 | B2* | 10/2013 | Acharya | G06F 16/951 |
| | | | | 707/751 |
| 10,467,252 | B1* | 11/2019 | Barsony | G06F 16/285 |
| 2010/0306204 | A1* | 12/2010 | Chitiveli | G06F 16/353 |
| | | | | 707/753 |
| 2011/0219012 | A1* | 9/2011 | Yih | G06F 16/00 |
| | | | | 706/12 |

(Continued)

OTHER PUBLICATIONS

Qiu, Junping, et al., "Detection and Optimized Disposal of Near-Duplicate Pages", ICFCC 2010, Wuhan, China, May 21-24, 2010, pp. V2-604-V2-607.*

(Continued)

*Primary Examiner* — Robert Stevens
(74) *Attorney, Agent, or Firm* — Sughrue Mion, PLLC

(57) ABSTRACT

A document processing device includes: a document classification section configured to sequentially apply a plurality of classification processes in a prescribed sequence to a plurality of documents to classify the plurality of documents into a plurality of groups; and a classification determination section configured to every time one of the plurality of classification processes is applied, determine whether or not each group contains two or more documents. The document classification section, after applying a preceding one of the plurality of classification processes, applies a succeeding one of the plurality of classification processes to the two or more documents in each group determined as containing the two or more documents. The prescribed sequence is an ascending order of an amount of calculation involved in the plurality of classification processes.

10 Claims, 10 Drawing Sheets

(56) References Cited

U.S. PATENT DOCUMENTS

| | | | | |
|---|---|---|---|---|
| 2015/0033120 A1* | 1/2015 | Cooke | ................... | G06F 40/194 |
| | | | | 715/256 |
| 2017/0076203 A1* | 3/2017 | Knight | ..................... | G06N 5/02 |
| 2017/0091321 A1* | 3/2017 | Morimoto | ............. | G06F 16/353 |
| 2017/0235820 A1* | 8/2017 | Conrad | ................. | G06F 16/358 |
| | | | | 707/728 |

OTHER PUBLICATIONS

Liao, Fei, et al., "Combined Self-Attention Mechanism for Chinese Named Entity Recognition in Military", Future Internet 2019, vol. 11, Aug. 2019, pp. 1-11.*

Bassma S. Alsulami et al., "Near Duplicate Document Detection Survey", International Journal of Computer Science & Communication Networks, Apr. 2012, vol. 2(2), pp. 147-151.

* cited by examiner

DOCUMENT PROCESSING DEVICE, METHOD OF CONTROLLING DOCUMENT PROCESSING DEVICE, AND NON-TRANSITORY COMPUTER-READABLE RECORDING MEDIUM CONTAINING CONTROL PROGRAM

CROSS-REFERENCE TO RELATED APPLICATION

The present application claims priority from Japanese Patent Application No. 2019-205267 filed on Nov. 13, 2020, the entire contents of which are hereby incorporated by reference into this application.

BACKGROUND OF THE INVENTION

1. Field of the Invention

The present disclosure relates primarily to document processing devices.

2. Description of the Related Art

Bassma S. Alsulami, and two others describe an approach to near duplicate document detection in their article, "Near Duplicate Document Detection Survey," International Journal of Computer Science & Communication Networks, Vol 2(2), 147-151.

SUMMARY OF THE INVENTION

The technology described in the article above may decelerate the detection of near-duplicate documents because the technology does not detect near-duplicate documents in accordance with the identicalness of two documents. In view of this problem, the present disclosure, in an aspect thereof, has an object to provide, for example, a document processing device that detects near-duplicate documents with improved speed without reducing detection accuracy.

According to the first aspect of the disclosure, a document processing device includes: a document classification section configured to sequentially apply a plurality of classification processes in a prescribed sequence to a plurality of documents to classify the plurality of documents into a plurality of groups; and a classification determination section configured to every time one of the plurality of classification processes is applied, determine whether or not each group contains two or more documents. The document classification section, after applying a preceding one of the plurality of classification processes, applies a succeeding one of the plurality of classification processes to the two or more documents in each group determined as containing the two or more documents. The prescribed sequence is an ascending order of an amount of calculation involved in the plurality of classification processes.

According to the second aspect of the disclosure, a method of controlling a document processing device includes: sequentially applying a plurality of classification processes in a prescribed sequence to a plurality of documents to classify the plurality of documents into a plurality of groups; and every time one of the plurality of classification processes is applied, determining whether or not each group contains two or more documents. In the classification of the plurality of documents into the plurality of groups, after applying a preceding one of the plurality of classification processes, the method applies a succeeding one of the plurality of classification processes to the two or more documents in each group determined as containing the two or more documents. The prescribed sequence is an ascending order of an amount of calculation involved in the plurality of classification processes.

According to the third aspect of the disclosure, a non-transitory computer-readable recording medium containing a control program that causes a computer to function as the document processing device described above, the control program, when executed by the computer, causes the computer to function as the document classification section and the classification determination section.

DETAILED DESCRIPTION OF THE INVENTION

Figure 1:
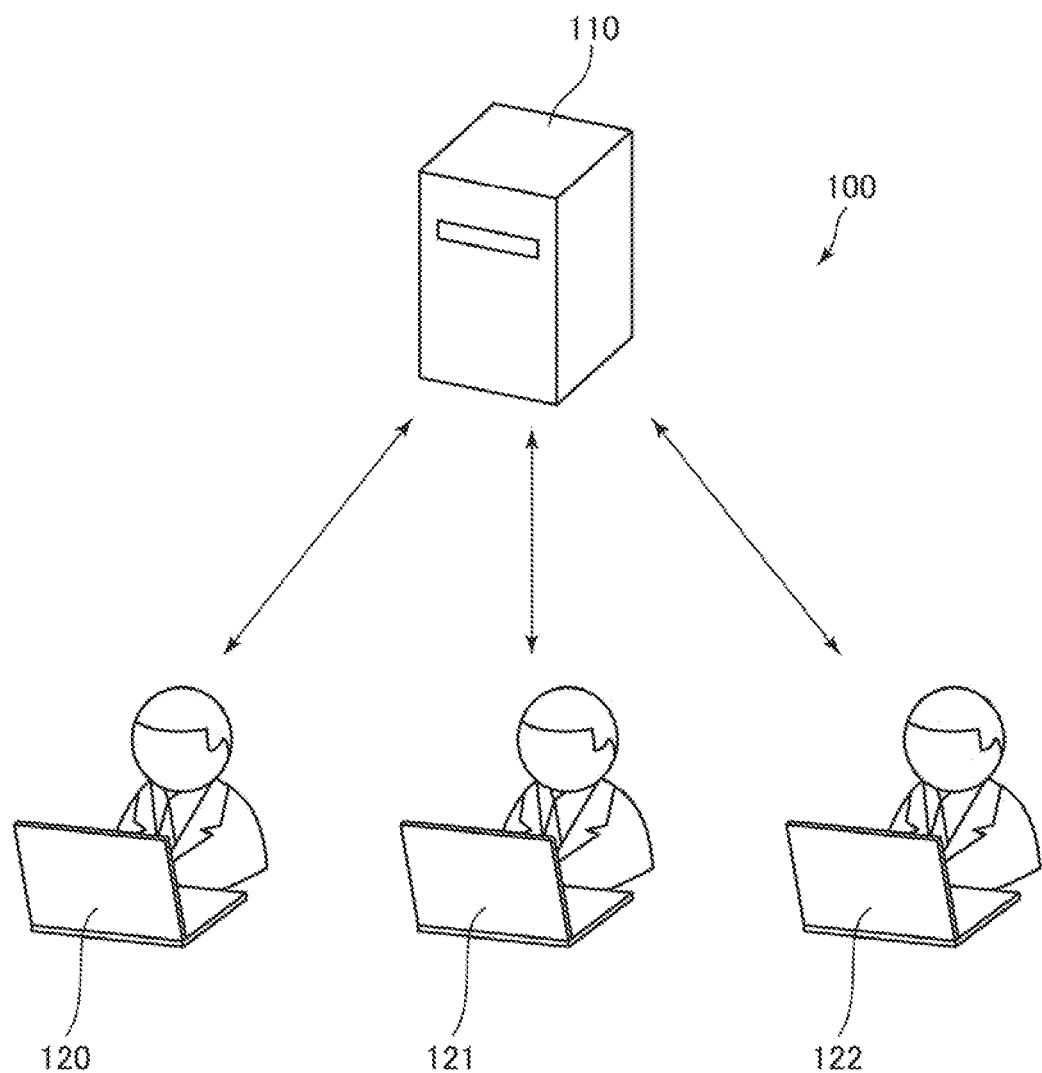
FIG. 1 is a schematic illustration of an exemplary configuration of a document review system in accordance with an aspect of the present disclosure.

The following will describe an aspect of the present disclosure with reference to FIGS. 1 to 9. Identical or equivalent elements in the drawings are denoted by the same reference numerals, and description thereof is not repeated.

Configuration of Document Review System 100

FIG. 1 is a schematic illustration of an exemplary configuration of a document review system 100. The document review system 100 is a system that enables reviewers to efficiently review documents (examine document content). As shown as an example in FIG. 1, the document review system 100 includes a document processing device 110 and user terminals 120 to 122.

The document processing device 110 enables systematic operation of the document review system 100 and, for example, has a function of evaluating how closely a document is related to an event. Each document may be electronic data in any format that at least partially contains, for example, characters, numbers, and/or symbols and may be, for example, document data (e.g., email, meeting minutes, specifications, user manuals, various technical documents, various reports, contracts, marketing material, business plans, electronic clinical records, or Web pages), presentation data, spreadsheet data, or an image or video at least partially representing text. An event may be anything that a reviewer finds relevant or irrelevant to a document and may be, for example, a lawsuit, an information leak, a compliance violation, a harassment, another illegal activity, a resignation, an accident, or an illness.

The user terminals 120 to 122 are for use by respective reviewers in reviewing documents and are connected to the document processing device 110 to be communicable each other. FIG. 1 shows an example where there are provided three user terminals. Alternatively, there may be provided one or more user terminals. Each reviewer reviews the document displayed on the user terminal 120 to 122 in terms of the relevance thereof to the event in accordance with prescribed criteria specified for the event and enters results of the review on the user terminal 120 to 122.

A description is now given of document review procedures by a reviewer using the document review system 100, by taking a lawsuit in the United States as an example of the event. A party in a lawsuit in the United States may have to undergo a discovery process. In other words, a party in a lawsuit may have to submit documents related to the lawsuit to the court and disclose the documents for hearings. In the process, numerous documents that may or may not be relevant to the lawsuit need to be classified into a group of those relevant to the lawsuit and a group of those irrelevant to the lawsuit in order to submit only those documents that are relevant to the lawsuit.

Reviewers are accordingly required to review documents that may be relevant to the lawsuit (hereinafter, will be referred to as "population") and determine for each document, for example, that the document is, for example, relevant to the lawsuit or irrelevant to the lawsuit. The population, which may contain from a few tens of thousands to a few millions of documents, is so large that the series of tasks related to the document review procedures needs to be streamlined.

A description is now given of an exemplary approach to the streamlining of the tasks as it is performed by the document review system 100. For example, the document processing device 110 first randomly extracts a small number of documents (e.g., 100 to 200 documents) from the population and transmits these documents to the user terminals 120 to 122. The user terminals 120 to 122 then present the documents to reviewers.

Each reviewer reviews this small number of documents presented to him/her (hereinafter, will be referred to as "pre-reviewing") and enters results of determining whether or not each document is relevant to the lawsuit on the user terminal 120 to 122. For instance, if the reviewer determines, in the pre-reviewing of the document, that the document is relevant to the lawsuit, he/she gives a "Relevant" label to the document to indicate that the document is relevant to the lawsuit. On the other hand, if the reviewer determines that the document is irrelevant, he/she gives a "Not-relevant" label to the document to indicate that the document is irrelevant to the lawsuit.

The reviewer gives a "Relevant" label or a "Not-relevant" label to each of the small number of documents. The user terminal 120 to 122 then transmits the labeling as a result of the pre-reviewing to the document processing device 110. Thereafter, the document processing device 110 causes an identifying model to learn using the result of the pre-reviewing. The identifying model identifies documents with the "Relevant" label on the basis of the result of the pre-reviewing. The identifying model may be any model of any type so long as the model is capable of identifying documents.

Next, the document processing device 110 assigns a score to each document in the population by using the identifying model. The score may be any indicator of the relevance of the document to the lawsuit and may be, for example, a numerical value in the range of 1 to 10,000 or a designation such as "high," "intermediate," or "low." The document processing device 110 assigns a higher score to a document with higher relevance and assigns a lower score to a document with lower relevance. In other words, the document processing device 110 evaluates the relevance of the document to the lawsuit through the score calculated using the learned identifying model.

Hence, the document processing device 110 can, for example, have the reviewers sequentially review the documents in the descending order of the scores thereof and exclude documents having a lower score than a prescribed value from reviewing. In other words, the document review system 100 enables the reviewers to review documents lightly or heavily in accordance with the scores assigned by the document processing device 110. The document review system 100 can hence improve efficiency in reviewers reviewing numerous documents.

The present embodiment has been described assuming that the event is a lawsuit in the United States. The document review system 100 is also capable of improving reviewing efficiency through similar procedures when the event is something other than a lawsuit.

Hardware Configuration of Document Processing Device 110

Figure 2:
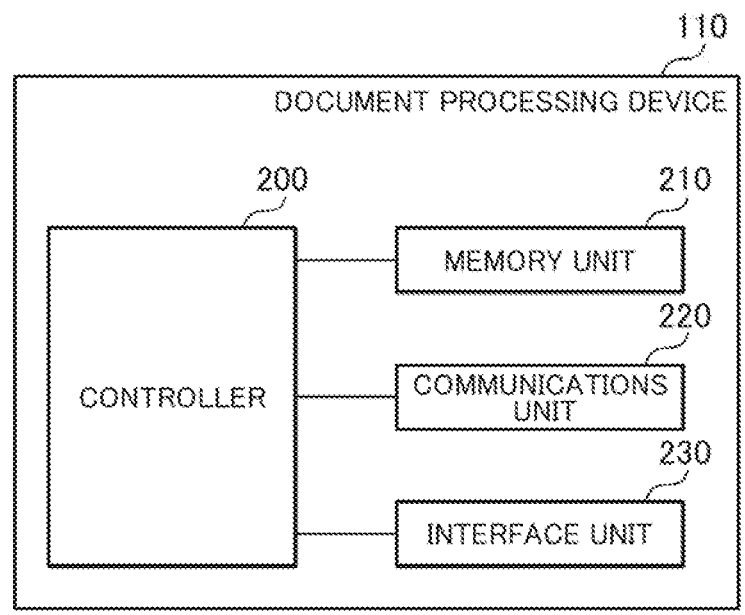
FIG. 2 is a diagram of an exemplary hardware configuration of a document processing device in accordance with an aspect of the present disclosure.

FIG. 2 is a diagram of an exemplary hardware configuration of the document processing device 110. As shown as an example in FIG. 2, the document processing device 110 includes, for example, a controller 200, a memory unit 210, a communications unit 220, and an interface unit 230.

The controller 200 has a function of collectively controlling various functions of the document processing device 110 and is realized using, for example, a CPU (central processing unit) or a like processor. The controller 200 causes each section in the controller 200, which will be described later with reference to FIG. 3, to function in accordance with control programs contained in the memory unit 210.

The memory unit 210 is a storage device capable of storing information and may include, for example, a hard disk, an SSD (solid state drive), a semiconductor memory, or a DVD. The memory unit 210 contains, for example, control programs for the controller 200, data required by the controller 200 to function properly, documents to be reviewed by reviewers, and identifying models used to identify documents. FIG. 2 shows the document processing device 110 including the memory unit 210. Alternatively, for example, the document processing device 110 may include no memory unit 210 and instead use an external storage device (e.g., cloud storage) located outside the document processing device 110.

The communications unit 220 transmits and receives documents and other data to and from the user terminals 120 to 122. The communications unit 220 is, for example, a piece of hardware that is communicable with external devices over a network under a prescribed communication scheme. The communications unit 220 needs only to have functions through which communications with external devices can be achieved and is not limited, for example, in terms of communication lines, communication schemes, and communication media.

The interface unit 230 provides a connection interface to which input/output devices can be connected. The interface unit 230 may be, for example, a USB terminal, an HDMI® terminal, or an audio output terminal. The user of the document processing device 110 may connect, for example, a keyboard and a mouse to the USB terminal, so that he/she can input information to the document processing device 110. Alternatively or additionally, the user may connect, for example, a display device to the HDMI® terminal to have a video information output of the document processing device 110 displayed on the display device.

Functional Configuration of Controller 200

Figure 3:
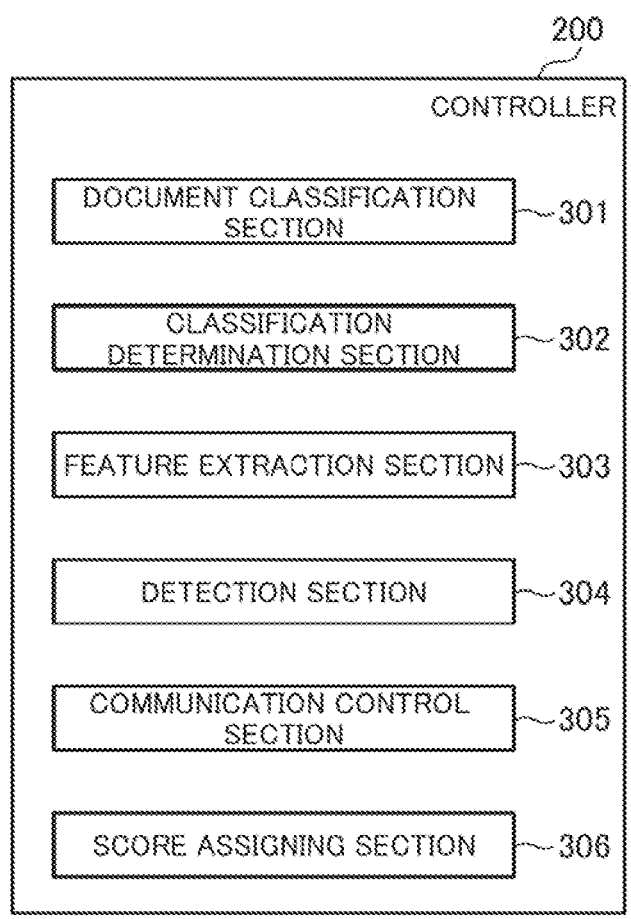
FIG. 3 is a functional block diagram of an exemplary functional configuration of a controller in the document processing device.

FIG. 3 is a functional block diagram of an exemplary functional configuration of the controller 200 in the document processing device 110. As shown as an example in FIG. 3, the controller 200 includes, for example, a document classification section 301, a classification determination section 302, a feature extraction section 303, a detection section 304, a communication control section 305, and a score assigning section 306.

The document classification section 301 sequentially applies filtering processes (classification processes) 1 to 4 in a prescribed sequence to a plurality of documents to classify the population (collection of documents) into groups. The prescribed sequence in this context is the ascending order of the amount of calculation involved in the filtering processes 1 to 4. Each filtering process 1 to 4 in this context may be a process of further classifying a group evaluated as containing two or more documents. Specific examples of each filtering process will be described later with reference to FIGS. 5 to 9.

After one of the filtering processes 1 to 4 (a "preceding classification process": e.g., the filtering process 1) is applied, the document classification section 301 applies another one of the filtering processes 1 to 4 (a "succeeding classification process": e.g., the filtering process 2 which follows the filtering process 1) to each document in a group(s) that the classification determination section 302 has evaluated as containing two or more documents.

Every time one of the filtering processes 1 to 4 is applied, the classification determination section 302 checks each resultant group to evaluate whether or not the group contains two or more documents. Differently put, every time one of the filtering processes 1 to 4 is applied, the classification determination section 302 checks each resultant group to determine whether or not there is a group containing a single document. If there is such a group, the document processing device 110 determines that there is no possibility that there is a near duplicate of the single document in the group and excludes the document from the succeeding filtering process. A detailed description will be given later with reference to FIGS. 5 to 9 on how these processes are made by the classification determination section 302.

In each of the filtering processes 1 to 4, the feature extraction section 303 may extract a common feature of the documents to be classified that matches that filtering process 1 to 4. Specific examples of the feature extracted from the documents will be described later with reference to FIGS. 5 to 9.

After the filtering process 4 (last classification process) is applied to the two or more documents, the detection section 304 may detect a plurality of documents (e.g., documents A to D, documents E to G, or documents H to I) in a group as being a set of duplicate or similar (near duplicate) documents. A detailed description will be given later with reference to FIGS. 5 to 9 on the process of detecting near-duplicate documents.

The communication control section 305 transmits documents to be reviewed by the reviewers to the respective user terminals 120 to 122 so that the user terminals 120 to 122 can present the documents to the reviewers. The communication control section 305 also receives results of the reviews carried out by the reviewers from the user terminals 120 to 122 to store the results in the memory unit 210.

The score assigning section 306 assigns, to each document in the population, a score indicating the relevance of the document to an event (e.g., lawsuit) by using a prescribed identifying model. Specifically, the score assigning section 306 assigns a higher score to a document in the population with higher relevance to the event and assigns a lower score to a document with lower relevance by using an identifying model.

Detecting Near-Duplicate Documents

Figure 4A:
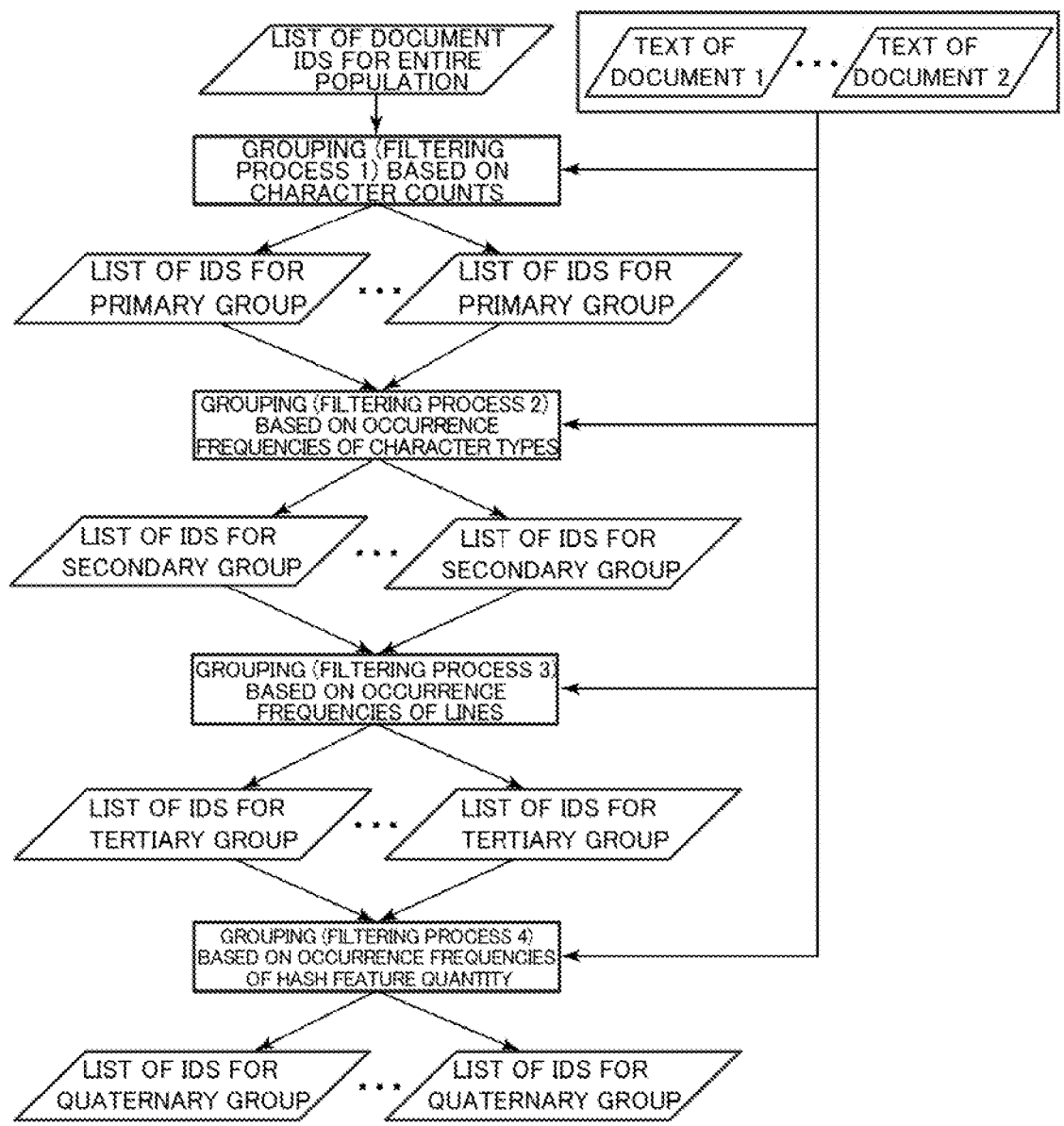
FIG. 4A is a schematic diagram of an exemplary process of the document processing device detecting near-duplicate documents.
Figure 4B:
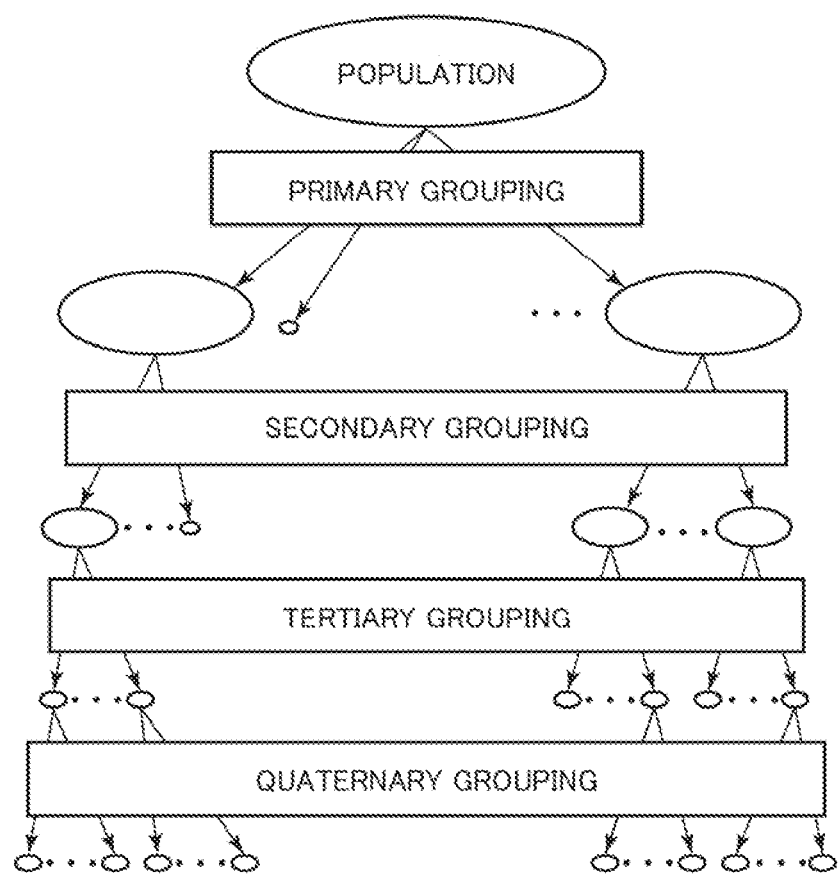
FIG. 4B is a schematic diagram of the exemplary process of the document processing device detecting near-duplicate documents.

FIGS. 4A and 4B are schematic diagrams of an exemplary process of the document processing device 110 detecting near-duplicate documents. Two "near-duplicate" documents, for example, at least partially contain identical or similar text or content.

As an example, assume that document A contains N characters and also that document B contains M characters (N and M are natural numbers). The document processing device 110 may regard documents A and B as near-duplicate documents if $|N-M| \leq n$ where n is the number of identical characters in the documents. This number, "n," may be any natural number and, for example, set to different values in accordance with the types of the documents.

As an alternative example, assume that both documents A and B contain 10 pages. The document processing device 110 may regard documents A and B as near-duplicate documents, for example, if (a) the documents contain 9 pages of identical content in the same sequence or if (b) the documents contain 10 pages of identical content in the same sequence, but one different character in each page.

The document processing device 110 detects near-duplicate documents for the following purposes. If a reviewer determines that a document is relevant to an event, a document which is similar to the determined document with a relevancy is also likely to be relevant to the event. For instance, if a reviewer determines that an email is relevant to a lawsuit, an email that quotes the content of the first email is likely to be relevant to the lawsuit because the second email contains the content of the first email. Likewise, a third email that quotes the content of the second email is also relevant to the lawsuit.

When these three emails are detected to be near duplicates, the reviewer needs to review only one of the three emails, and it is safely presumed that reviewing of the remaining two emails will produce the same results. Accordingly, the document processing device 110 can increase reviewing efficiency by a factor of 3. As could be understood from this example, there are significant practical benefits in the document processing device 110 detecting near-duplicate documents.

As shown as an example in FIGS. 4A and 4B, the document processing device 110 sequentially carries out the filtering process 1 (primary grouping), the filtering process 2 (secondary grouping), the filtering process 3 (tertiary grouping), and the filtering process 4 (quaternary grouping) on each document to repeatedly divide (and subdivide) the population into groups. If there is a plurality of documents in a group after the filtering process 4, the document processing device 110 detects these documents as near-duplicate documents.

On the other hand, if there is a single document in a group, it indicates that there is no near duplicate of that document. The document processing device 110 therefore stops carrying out filtering processes when there remains only one document in a group in a series of filtering processes.

Figure 5:
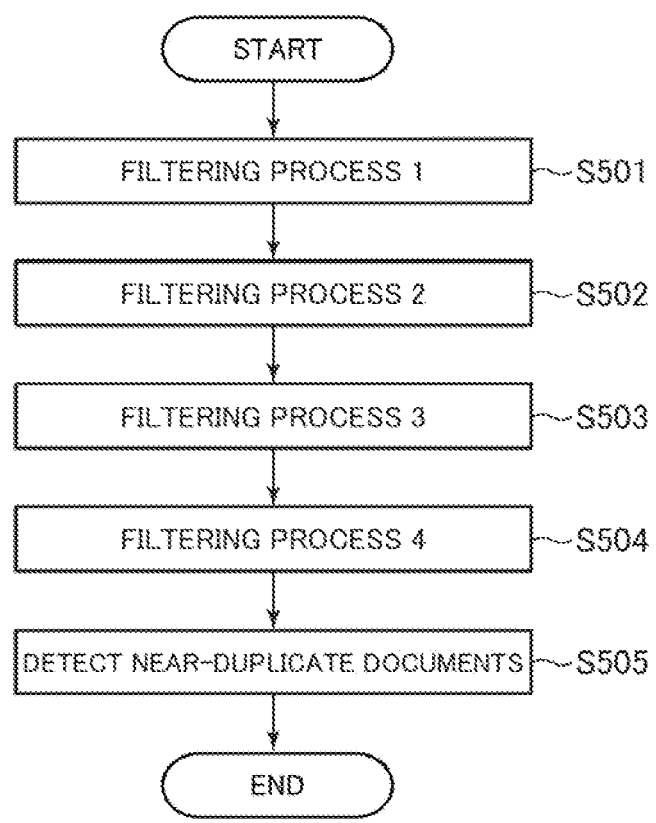
FIG. 5 is a flow chart representing an exemplary process of the document processing device detecting near-duplicate documents.

FIG. 5 is a flow chart representing an exemplary process of the document processing device 110 detecting near-duplicate documents. As shown as an example in FIG. 5, the document processing device 110 sequentially carries out the filtering processes 1 to 4 on the documents in the population (S501 to S504) to finally detect near-duplicate documents (S505).

The document processing device 110 first applies the filtering process 1 to all the documents in the population (S501). Specifically, the document classification section 301 classifies the documents in the population into N1 groups (N1 is a natural number) on the basis of a feature extracted by the feature extraction section 303 (S501). Then, if there is a group containing a single document, the classification determination section 302 excludes the document from the filtering process 2.

Next, the document processing device 110 applies the filtering process 2 to the remaining, non-excluded documents (S502). Specifically, the document classification section 301 classifies the documents to which the filtering process 2 is applied into N2 groups (N2 is a natural number) on the basis of another feature extracted by the feature extraction section 303 (S502). Then, if there is a group containing a single document, the classification determination section 302 excludes the document from the filtering process 3.

Next, the document processing device 110 applies the filtering process 3 to the remaining, non-excluded documents (S503). Specifically, the document classification section 301 classifies the documents to which the filtering process 3 is applied into N3 groups (N3 is a natural number) on the basis of a further feature extracted by the feature extraction section 303 (S503). Then, if there is a group containing a single document, the classification determination section 302 excludes the document from the filtering process 4.

Finally, the document processing device 110 applies the filtering process 4 to the remaining, non-excluded documents (S504). Specifically, the document classification section 301 classifies the documents to which the filtering process 4 is applied into N4 groups (N4 is a natural number) on the basis of yet another feature extracted by the feature extraction section 303 (S504). Then, the detection section 304 detects two or more documents that remain in a resultant group after the application of the filtering process 4 as near-duplicate documents (S505).

As described here, the document processing device 110 sequentially applies the filtering processes 1 to 4 to all the documents and excludes the documents for which no near duplicates are found from the succeeding filtering process. Then, if there still remains a plurality of documents in a group after the application of the filtering process 4, the document processing device 110 determines that this plurality of documents is a set of near-duplicate documents.

Each filtering process will be described next in detail with reference to FIGS. 6 to 9.

Filtering Process 1

Figure 6:
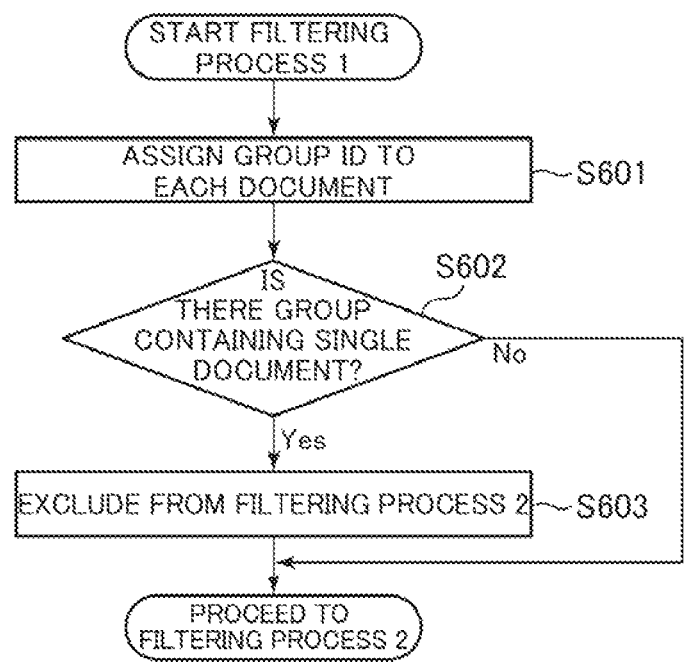
FIG. 6 is a flow chart representing an exemplary filtering process 1 implemented by the document processing device.

FIG. 6 is a flow chart representing an example of the filtering process 1 implemented by the document processing device 110. Steps S601 to S603 shown in FIG. 6 constitute at least part of step S501 shown as an example in FIG. 5.

The feature extraction section 303 first calculates a quotient by dividing the character count of a document by a prescribed character count (e.g., 500 characters) and rounds down the quotient to the nearest whole number to extract the whole number as a feature of the document. Next, the document classification section 301 assigns a group ID to the document on the basis of the feature. For instance, if a document contains 1001 characters, the feature extraction section 303 calculates 1001/500=2.002, and the document classification section 301 assigns a group ID, "2," to the document.

The feature extraction section 303 performs similar calculation on each document in the population, so that the document classification section 301 can assign a group ID to all the documents (S601). Next, the classification determination section 302 evaluates whether or not there is a group containing a single document (S602). If there is such a group (YES in step S602), the document processing device 110 determines that there is no possibility that there is a near duplicate of the single document in the group and excludes the document from the filtering process 2 (S603).

In other words, the filtering process 1 may be a classification process of counting characters in each document to classify the documents on the basis of the distribution of the character counts. Hence, the document processing device 110 is capable of classifying the documents on the basis of a tendency that documents with close character counts have similar content.

The feature extraction section 303 may increase or decrease the prescribed character count in a predetermined range. In so doing, the document classification section 301 assigns two or more group IDs to each document. For instance, if the feature extraction section 303 increases or decreases the prescribed character count in the range of 496 to 505, the document classification section 301 assigns 1 (when the prescribed character count is from 502 to 505) and 2 (when the prescribed character count is from 496 to 500) as group IDs to a document containing 1001 characters. This configuration allows the document processing device 110 to assign group IDs in a flexible manner, thereby increasing accuracy in the classification.

Filtering Process 2

Figure 7:
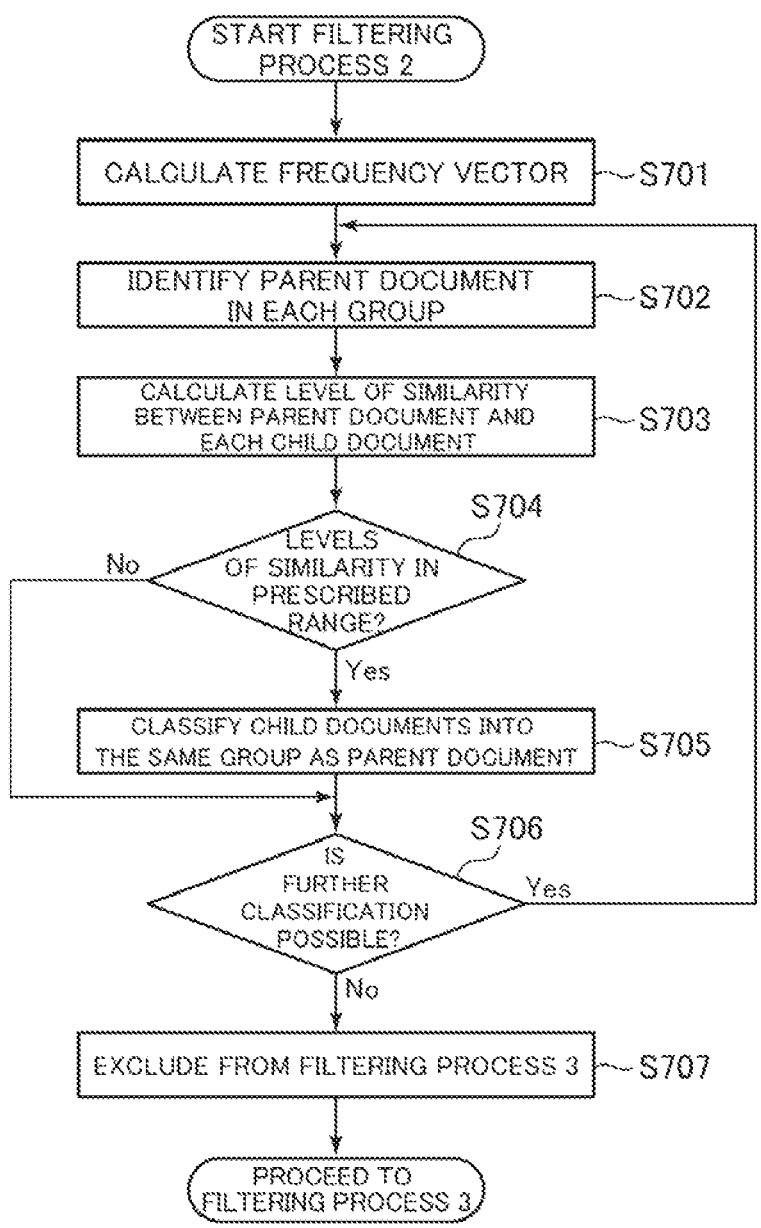
FIG. 7 is a flow chart representing an exemplary filtering process 2 implemented by the document processing device.

FIG. 7 is a flow chart representing an example of the filtering process 2 implemented by the document processing device 110. Steps S701 to S707 shown in FIG. 7 constitute at least part of step S502 shown as an example in FIG. 5.

The feature extraction section 303 first calculates a frequency vector for a document to which the filtering process 2 is to be applied to extract the frequency vector as a feature of the document (S701). A frequency vector is, for example, a vector containing a character count of each type of characters that appears in the document in an associated dimension.

As an example, assume that a document contains 250 Hiragana characters, 140 Katakana characters, 200 ideographs or Kanji characters, 340 alphabetic letters, 30 numeric characters, and 10 symbols. The document has a frequency vector of (250, 140, 200, 340, 30, 10). The number of dimensions of the frequency vector may change with the definition of character types. For instance, in addition to these 6 types of characters, the document may contain, for example, Simplified Chinese characters, Traditional Chinese characters, and Korean letters, in which case the number of dimensions of the frequency vector is 9 or greater.

The document classification section 301 next identifies a document with the highest character count in each group 1 to N1 generated in the filtering process 1 as a parent document (S702). The document classification section 301 then calculates a level of similarity between the frequency vector of the parent document in a group and the frequency vector of each non-parent document (child document) in the group (S703). If the levels of similarity fall in a prescribed range (YES in step S704), the document classification section 301 classifies the child documents into the same group as the parent document (S705).

As an example, assume that group 1 contains documents A to Z where document A has the highest character count. The document processing device 110 identifies document A as the parent document and calculates a level of similarity between the frequency vector of parent document A and the frequency vector of each child document B to Z in group 1. If all the levels of similarity between parent document A and child documents B to R fall in a prescribed range, the document classification section 301 classifies documents A to R into group 1-1.

The document classification section 301 calculates the level of similarity, for example, by measuring distance between the two frequency vectors (e.g., Manhattan distance or Euclidean distance). The level of similarity may be calculated by any method other than measuring distance between the two frequency vectors.

The document classification section 301 next identifies, in each group 1 to N1, a document with the highest character count of all those remaining child documents which were not classified into the same group as the parent document as a new parent document. The document classification section 301 then classifies the new parent document and the remaining child documents into the same group on the basis of the levels of similarity between the new parent document and the remaining child documents.

As an example, assume that document S has the highest character count of all remaining documents S to Z in group 1. The document classification section 301 identifies document S as a new parent document and calculates a level of similarity between the frequency vector of parent document S and the frequency vector of each child document T to Z. If all the levels of similarity between parent document S and child documents T to V fall in a prescribed range, the document classification section 301 classifies documents S to V into group 1-2.

The document classification section 301 repeats this classification process on each group 1 to N1 so long as it is possible to carry out the classification process (YES in step S706). When the classification process can be no longer carried out (NO in step S706), the classification determination section 302 determines that there is no possibility that there is a near-duplicate document of the remaining document and excludes the remaining document from the filtering process 3 (S707).

As an example, assume that document W has the highest character count of all remaining documents W to Z in group 1. The document classification section 301 identifies document W as a new parent document (S702) and calculates a level of similarity between the frequency vector of parent document W and the frequency vector of each child document X to Z (S703). If the level of similarity between parent document W and child document X falls in a prescribed range, the document classification section 301 classifies documents W and X into group 1-3 (S705).

On the other hand, if neither the level of similarity calculated using remaining document Y in group 1 as a parent document nor the level of similarity calculated using remaining document Z in group 1 as a parent document falls in a prescribed range (NO in step S704), the document classification section 301 determines that it is impossible to further divide the population into subgroups (NO in step S706), and the classification determination section 302 excludes documents Y and Z from the filtering process 3 (S707). The document processing device 110 further divides the groups generated in the filtering process 1 by performing this calculation on each group 1 to N1, to further classify the documents.

In other words, the filtering process 2 may be a classification process of obtaining the occurrence count of each character type in the two or more documents determined to be possible near duplicates to classify the two or more documents on the basis of the distribution of the occurrence counts. Hence, the document processing device 110 is capable of further classifying the documents on the basis of a tendency that documents in which the same type of characters appear at close frequencies have similar content.

Filtering Process 3

Figure 8:
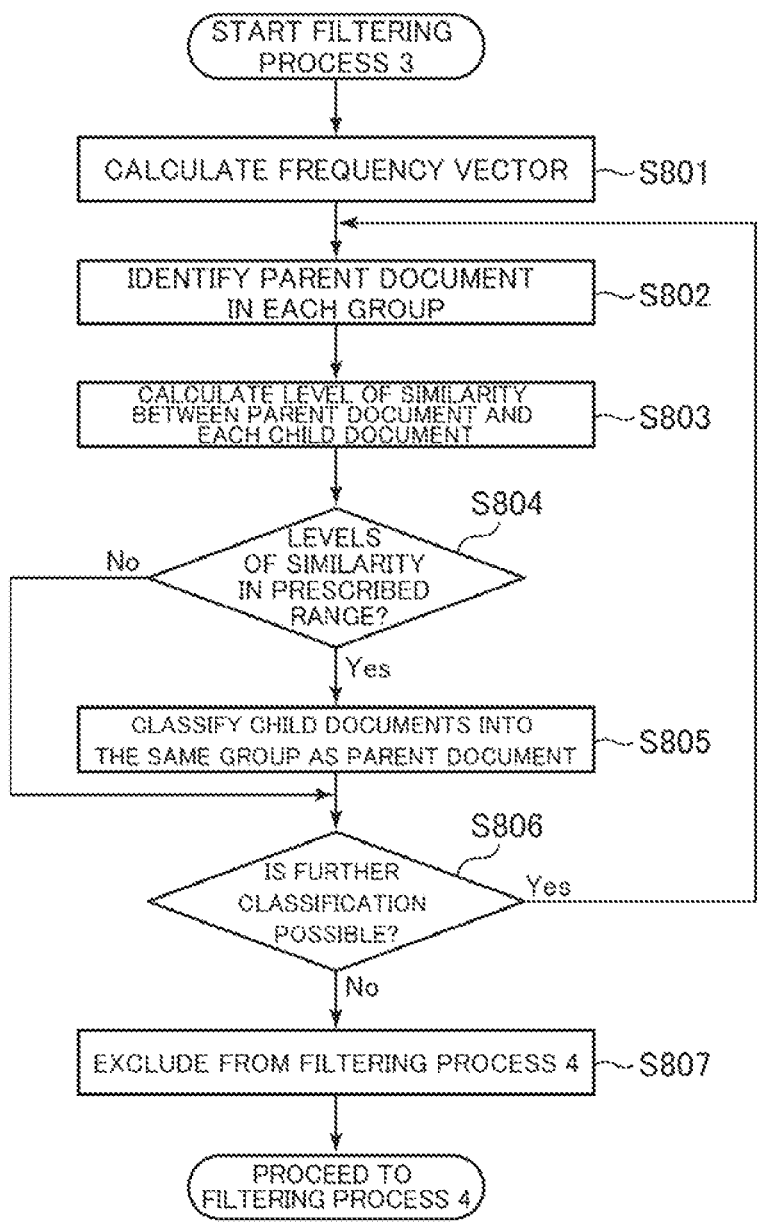
FIG. 8 is a flow chart representing an exemplary filtering process 3 implemented by the document processing device.

FIG. 8 is a flow chart representing an example of the filtering process 3 implemented by the document processing device 110. Steps S801 to S807 shown in FIG. 8 constitute at least part of step S503 shown as an example in FIG. 5.

The feature extraction section 303 first calculates a line frequency vector for a document to which the filtering process 3 is to be applied, to extract the line frequency vector as a feature of the document (S801). A line frequency vector is, for example, a vector containing, in each dimension thereof, a single line separated by a line break from the other lines. As an example, if a document contains a sentence, "This document (line break) is important," the document processing device 110 places "This document" in a first dimension of the line frequency vector and "is important." in a second dimension thereof.

The document classification section 301 next identifies a document with the highest line count in each group 1 to N2 generated in the filtering process 2 as a parent document (S802). The document classification section 301 then calculates a level of similarity between the line frequency vector of the parent document in a group and the line frequency vector of each non-parent document (child document) in the group (S803). If the levels of similarity fall in a prescribed range (YES in step S804), the document classification section 301 classifies the child documents into the same group as the parent document (S805).

As an example, assume that group 1-1 contains documents A to R where document A has the highest line count. The document classification section 301 identifies document A as the parent document and calculates a level of similarity between the line frequency vector of parent document A and the line frequency vector of each child document B to R in group 1-1. If all the levels of similarity between parent document A and child documents B to K fall in a prescribed range, the document classification section 301 classifies documents A to K into group 1-1-1.

The document classification section 301 next identifies, in each group 1 to N2, a document with the highest line count of all those remaining documents which were not classified into the same group as the parent document as a new parent document. The document classification section 301 then further classifies the new parent document and the remaining child documents into the same group on the basis of the levels of similarity between the new parent document and the remaining child documents.

As an example, assume that document L has the highest line count of all remaining documents L to R in group 1-1. The document classification section 301 identifies document L as a new parent document and calculates a level of similarity between the line frequency vector of parent document L and the line frequency vector of each child document M to R. If all the levels of similarity between parent document L and child documents M and N fall in a prescribed range, the document classification section 301 classifies documents L to N into group 1-1-2.

The document classification section 301 repeats this classification process on each group 1 to N2 so long as it is possible to carry out the classification process (YES in step S806). When the classification process can be no longer carried out (NO in step S806), the classification determination section 302 determines that there is no possibility that there is a near-duplicate document of the remaining document and excludes the remaining document from the filtering process 4 (S807).

As an example, assume that document O has the highest character count of all remaining documents O to R in group 1-1. The document classification section 301 identifies document O as a new parent document (S802) and calculates a level of similarity between the line frequency vector of parent document O and the line frequency vector of each child document P to R (S803). If the level of similarity between parent document O and child document P falls in a prescribed range, the document classification section 301 classifies documents O and P into group 1-1-3 (S805).

On the other hand, neither the level of similarity calculated using remaining document Q in group 1-1 as a parent document nor the level of similarity calculated using remaining document R in group 1-1 as a parent document falls in a prescribed range (NO in step S804), the document classification section 301 determines that it is impossible to further divide the population into subgroups (NO in step S806), and the classification determination section 302 excludes documents Q and R from the filtering process 4 (S807). The document processing device 110 further divides the groups generated in the filtering process 2 by performing this calculation on each group 1 to N2, to further classify the documents.

In other words, the filtering process 3 may be a process of comparing the character string in each line between each pair of documents in the two or more documents determined to be possible near duplicates to classify the two or more documents on the basis of the results of the comparison. Hence, the document processing device 110 is capable of further classifying the documents on the basis of a tendency that documents with similar lines have similar content.

Filtering Process 4

Figure 9:
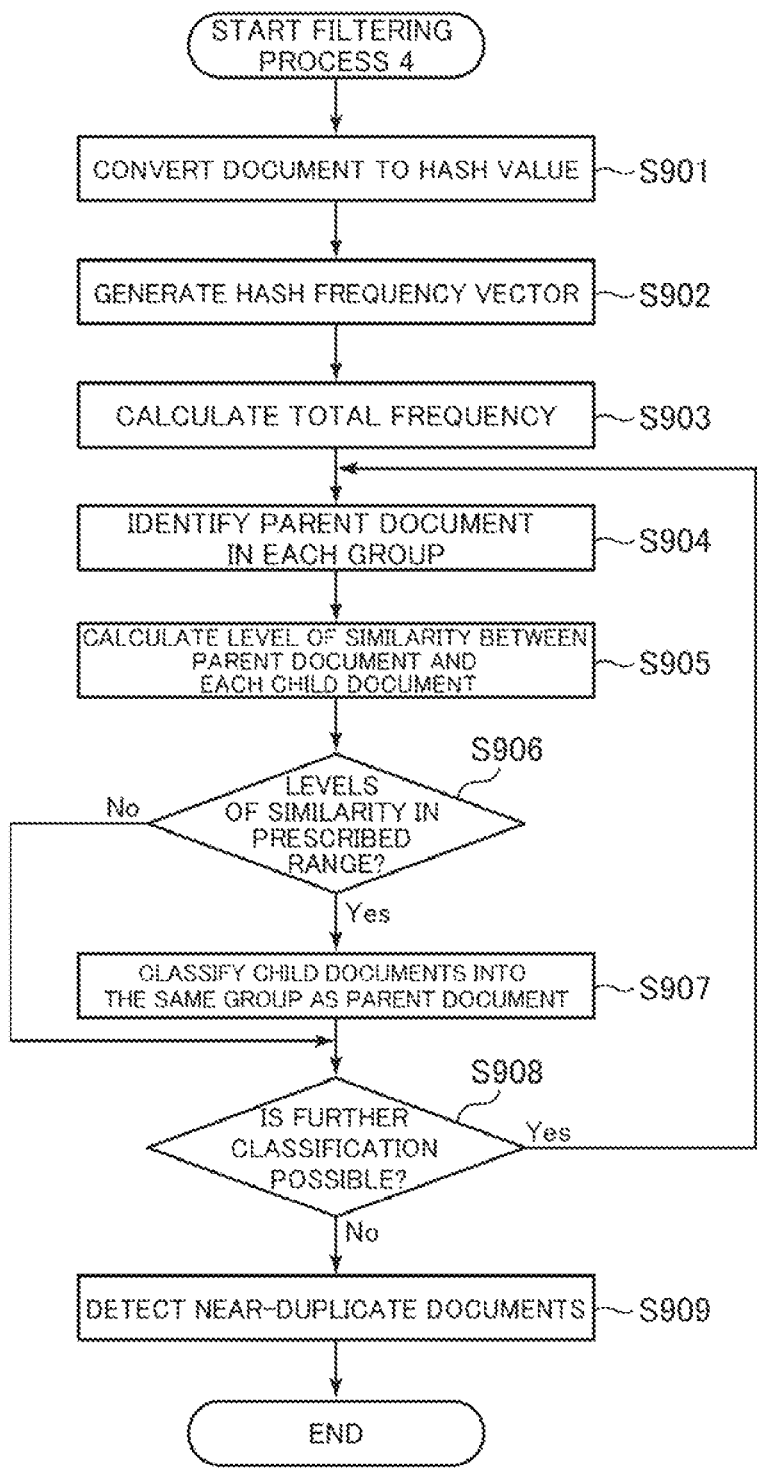
FIG. 9 is a flow chart representing an exemplary filtering process 4 implemented by the document processing device.

FIG. 9 is a flow chart representing an example of the filtering process 4 implemented by the document processing device 110. Steps S901 to S908 shown in FIG. 9 constitute at least part of step S504 shown as an example in FIG. 5, and step S909 is an equivalent of step S505.

The feature extraction section 303 first converts a document to which the filtering process 4 is to be applied to a hash value by using two types of hash functions to extract two hash values obtained through the conversion as a feature of the document (S901).

A first hash function is, for example, a function that takes character codes with five characters as an argument and returns a hash value of 0 to 3. A second hash function is, for example, a function that takes character codes with five characters as an argument and returns a hash value of 4 to 7. The number of characters of the character codes given to the hash functions may be variable. Additionally, the number of hash functions, the return values from the hash functions, and the range of the return values may be altered in any suitable manner.

As an example, the feature extraction section 303 gives the character codes that correspond to five characters from the first character (that is, the first to fifth characters) of the document to the first hash function and the second hash function to have two hash values returned. The feature extraction section 303 then gives the character codes that correspond to five characters from the second characters (that is, the second to sixth characters) of the document to the first hash function and the second hash function to have two hash values returned.

The feature extraction section 303 then continues likewise to give the character codes that correspond to next five characters of the document to the two types of hash functions to extract two hash values, by shifting the target character range by one character at a time. Therefore, the feature extraction section 303 obtains 2×(n-4) hash values if the document contains n characters.

The feature extraction section 303 next calculates the frequencies of 8 types of hash values in each document and generates a hash frequency vector (S902) to extract the hash frequency vector as a feature of that document. A hash frequency vector is a vector containing the frequency of a hash value (m-1) in the m-th dimension thereof.

The document classification section 301 subsequently calculates a total frequency that is a sum of the frequencies of all the types of hash values (S903). The document classification section 301 then identifies a document with the highest total frequency in each group 1 to N3 generated in the filtering process 3 as a parent document (S904) and calculates a level of similarity between the hash frequency vector of the parent document in a group and the hash frequency vector of each non-parent document (child document) in the group (S905). If the levels of similarity fall in a prescribed range (YES in step S906), the document classification section 301 classifies the child documents into the same group as the parent document (S907).

As an example, assume that group 1-1-1 contains documents A to K where document A has the highest total frequency. The document classification section 301 identifies document A as a parent document and calculates a level of similarity between the hash frequency vector of parent document A and the hash frequency vector of each child document B to K in group 1-1-1. If all the levels of similarity between parent document A and child documents B to D fall in a prescribed range, the document classification section 301 classifies documents A to D into group 1-1-1-1.

The document classification section 301 next identifies, in each group 1 to N3, a document with the highest total frequency of all those remaining documents which were not classified into the same group as the parent document as a new parent document. The document classification section 301 then further classifies the new parent document and the remaining child documents into the same group on the basis of the levels of similarity between the new parent document and the remaining child documents.

As an example, assume that document E has the highest total frequency of all remaining documents E to K in group 1-1-1. The document classification section 301 identifies document E as a new parent document and calculates a level of similarity between the hash frequency vector of parent document E and the hash frequency vector of each child document F to K. If all the levels of similarity between parent document E and child documents F and G fall in a prescribed range, the document classification section 301 classifies documents E to G into group 1-1-1-2.

The document classification section 301 repeats this classification process on each group 1 to N3 so long as it is possible to carry out the classification process (YES in step S908). When the classification process can be no longer carried out (NO in step S908), the detection section 304 detects a group containing a plurality of documents in classified groups 1 to N4 (N4 is a natural number) as a set of near-duplicate documents (S909).

As an example, assume that document H has the highest total frequency of all remaining documents H to K in group 1-1-1. The document classification section 301 identifies document H as a new parent document (S904) and calculates a level of similarity between the hash frequency vector of parent document H and the hash frequency vector of each child document I to K (S905). If the level of similarity between parent document H and child document I falls in a prescribed range, the document classification section 301 classifies documents H and I into group 1-1-1-3 (S907).

On the other hand, neither the level of similarity calculated using remaining document J in group 1-1-1 as a parent document nor the level of similarity calculated using remaining document K in group 1-1-1 as parent document falls in a prescribed range (NO in step S906), the document classification section 301 determines that it is impossible to further divide the population into subgroups (NO in step S908), and the detection section 304 detects documents A to D, documents E to G, and documents H to I as sets of near-duplicate documents (S909).

The document processing device 110 further divides the groups generated in the filtering process 3 by performing this calculation on each group 1 to N3, to further classify the documents. Hence, the document processing device 110 is capable of further classifying the documents on the basis of a tendency that documents with close hash value frequencies have similar content. The document processing device 110 then detects groups containing a plurality of documents in groups 1 to N4 classified in the filtering process 4 as a set of near-duplicate documents.

In other words, the filtering process 4 may be a classification process of converting characters in the two or more documents determined to be possible near duplicates into numerical values using prescribed functions, obtaining the occurrence count of each numerical value, to classify the two or more documents on the basis of the distribution of the occurrence counts.

As described above in detail with reference to FIGS. 6 to 9, the document processing device 110 is capable of detecting near-duplicate documents by sequentially applying the filtering processes 1 to 4 to each document. The document processing device 110 can hence obtain review results for all near-duplicate documents without having to have reviewers review all the near-duplicate documents.

Amount of Calculation of Each Filtering Process

A description will be given of the amount of calculation for the document processing device 110 to apply the filtering processes 1 to 4 (plurality of classification processes) to a document.

As described earlier with reference to FIGS. 6 to 9, the feature extraction section 303 extracts features 1 to 4 below of documents to be classified that match the filtering processes 1 to 4 in the document classification process:

1. a quotient of the character count of the document divided by a prescribed character count, rounded down to a whole number;

2. a frequency vector containing a character count of each type of characters that appears in the document in an associated dimension;

3. a line frequency vector containing a line separated by a line break from the other lines in an associated dimension; and 4. a hash frequency vector containing a frequency of each hash value of the document in an associated dimension.

The document classification section 301 then applies the filtering processes 1 to 4 that use these features to the documents to classify the documents.

In other words, an approximate amount of calculation in each filtering process can be obtained as a sum of the amount of calculation in the extraction of the features of the documents and the amount of calculation in the classification of the documents. The amount of calculation involved is smaller in the filtering process 3 than in the filtering process 4, smaller in the filtering process 2 than in the filtering process 3, and smaller in the filtering process 1 than in the filtering process 2. In other words, the document classification section 301 sequentially applies these filtering processes in the ascending order of the amount of calculation.

Meanwhile, the classification determination section 302 excludes documents for which there is less likely a near-duplicate document upon the application of a filtering process that involves a smaller amount of calculation. Therefore, a filtering process that involves s larger amount of calculation is applied to a smaller number of documents.

For these reasons, the present embodiment requires a smaller amount of calculation for implementing the entire near-duplicate document detection process (see FIG. 5) than conventional art. In other words, the document processing device 110 is capable of more quickly detecting near-duplicate documents than conventional art.

An example of the method for quickly detecting near-duplicate documents will be described. For instance, a single document containing by far the largest number of characters in a population is excluded from the filtering process 2 when the filtering process 1 is applied.

As another example, if two documents containing the same number of characters produce frequency vectors that have a low level of similarity therebetween (in other words, if the types of characters that appear in the two documents have different distributions), the two documents are classified into different groups. If either of the groups contains single document, this document is excluded from the filtering process 3 when the filtering process 2 is applied.

The document processing device 110 sequentially applies a plurality of filtering processes to each document in the ascending order of the amount of calculation involved in the filtering processes as detailed here. Documents for which there is less likely a near-duplicate document are therefore excluded from succeeding filtering processes earlier in the document classification process where the filtering process involves a smaller amount of calculation. The document processing device 110 is hence capable of more quickly detecting near-duplicate documents than conventional art where a single classification process is uniformly applied to all the documents.

The present embodiment has so far concretely described examples where the filtering processes 1 to 4 are used. Specific processing in each filtering process, the number of filtering processes, and other factors, however, are not limited to these examples, provided that an approach is taken where: a plurality of filtering processes that involve different amounts of calculation are sequentially applied to the population in the ascending order of the amount of calculation for classification of the documents; every time one of the filtering processes is applied, it is determined from the results of the classification whether or not there is a possibility that there are two or more similar documents in the population; and the application of a preceding filtering process is followed by the application of a succeeding filtering process to the two or more documents for which it is determined that there is such a possibility.

Accuracy in detecting near-duplicate documents in the present embodiment is as high as or higher than that in conventional art. As described above, since any specific processing may be implemented in each filtering process so long as the aforementioned approach is taken, for example, conventional filtering processes may be used in the present embodiment. In such cases, the detection accuracy at least does not fall.

The document processing device 110 is hence capable of improving the near-duplicate document detection speed without having to sacrifice detection accuracy. The document processing device 110 is also capable of, as described earlier, improving review efficiency by detecting near-duplicate documents. The document review system 100 is hence capable of further increasing the efficiency in having numerous documents reviewed by reviewers.

Additional Remarks

An aspect of the present disclosure is not limited to the embodiments and variation examples described above and may be implemented in various other forms. The configuration detailed above may be replaced by a practically identical configuration, a configuration that achieves the same effect and function, or a configuration that achieves the same purpose.

The document processing device 110 may be described as being, for example, a document processing device including: a document classification section for classifying a plurality of documents into a plurality of groups using a first classification process; and a classification determination section for determining whether or not each of the plurality of groups contains two or more documents, wherein the document classification section, after applying the first classification process, further classifies the two or more documents in each group evaluated as containing the two or more documents using a second classification process that differs from the first classification process, and the first classification process involves a smaller amount of calculation than the second classification process.

The document processing device 110 may alternatively be described as being, for example, a document processing device including: a document classification section for sequentially applying a plurality of classification processes that involve differ amounts of calculation to a plurality of documents in an ascending order of the amounts of calculation to classify the plurality of documents; and a classification determination section for, every time one of the plurality of classification processes is applied, determining based on a result of the classification whether or not there is a possibility that the plurality of documents includes two or more similar documents, wherein the document classification section, after applying a preceding one of the plurality of classification processes, applies a succeeding one of the plurality of classification processes to the two or more documents determined as being possibly similar.

A method of controlling a document processing device may be described as, for example, a method, including: the classification step of applying a first classification process to a plurality of documents to classify the plurality of documents into a plurality of groups; the identifying step of, after the first classification process is applied, identifying a group containing two or more documents in the plurality of groups; and the fine classification step of applying a second classification process to the two or more documents in each group identified as containing the two or more documents, wherein: the identifying step, after a k-th classification process is applied (k is a natural number), identifies a group containing two or more documents in the plurality of groups; the fine classification step applies a (k+1)-th classification process to the two or more documents in each group identified as containing the two or more documents; and the k-th classification process involves a smaller amount of calculation than the (k+1)-th classification process.

Software Implementation

The control blocks of the document processing device 110 (particularly, each of the sections 301, 302, 303, 304, 305, and 306 of the controller 200) may be implemented by software run by a controller (processor) such as a CPU (central processing unit). Specifically, the document processing device 110 includes, among others: a CPU that executes instructions from control programs or software by which various functions are provided; a ROM (read-only memory) or like storage device (referred to as a "storage medium") containing the control programs and various data in a computer-readable (or CPU-readable) format and connected to the CPU; and a RAM (random access memory) into which the control programs are loaded and connected to the CPU. The computer (or CPU) then retrieves and runs the control programs contained in the storage medium, thereby achieving an example of the object of an aspect of the present disclosure. For example, the computer (or CPU) functions as the sections 301, 302, 303, 304, 305, and 306 and executes the processes as shown in FIGS. 5-9. The storage medium may be a "non-transitory, tangible medium" such as a tape, a disc/disk, a card, a semiconductor memory, or programmable logic circuitry. The control programs may be supplied to the computer via any transmission medium (e.g., over a communications network or by broadcasting waves) that can transmit the control programs. The present disclosure, in an aspect thereof, encompasses data signals on a carrier wave that are generated during electronic transmission of the control programs.

The control programs may be written in any programing language including script languages such as ActionScript and JavaScript®, object-oriented programing languages such as Objective-C and Java®, and markup languages such as HTML 5. The scope of the present disclosure further encompasses: information processing terminals (e.g., smartphones and personal computers) including various units having functions provided by the control programs; and document processing devices including various units having other necessary functions.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A document processing device comprising:
a memory which stores a program; and
a processor configured to execute the program,
wherein the processor is configured to, if executing the program, execute operations comprising:
sequentially applying a plurality of classification processes, which are different classification processes from each other, in a prescribed sequence to a plurality of documents to classify the plurality of documents into a plurality of groups;

every time one of the plurality of classification processes is applied, determining whether or not each group contains two or more documents; and after applying a preceding one of the plurality of classification processes, applying a succeeding one of the plurality of classification processes, which has not been applied as the preceding one of the plurality of classification processes, to the two or more documents in each group determined as containing the two or more documents, wherein the prescribed sequence is a sequence in which the plurality of classification processes are applied in an ascending order of amounts of calculations by the processor if executing respective ones of the plurality of classification processes.

2. The document processing device according to claim 1, wherein the operations further comprise, after a last one of the plurality of classification processes is applied, detecting a plurality of documents in a group as a set of similar documents.

3. The document processing device according to claim 1, wherein the operations further comprise, when each of the plurality of classification processes is applied, extracting a common feature according to each of the plurality of classification processes from documents to be classified.

4. The document processing device according to claim 1, wherein the operations further comprise using, as one of the plurality of classification processes, a process of further classifying documents in each group determined as containing the two or more documents.

5. The document processing device according to claim 1, wherein the operations further comprise using, as one of the plurality of classification processes, a process of counting characters in each one of the plurality of documents to classify the plurality of documents based on a distribution of the character counts.

6. The document processing device according to claim 1, wherein the operations further comprise using, as one of the plurality of classification processes, a process of obtaining an occurrence count of each type of characters in the two or more documents to classify the two or more documents based on a distribution of the occurrence counts.

7. The document processing device according to claim 1, wherein the operations further comprise using, as one of the plurality of classification processes, a process of comparing a character string in each line of the two or more documents between each pair of documents in the two or more documents to classify the two or more documents based on a result of the comparison.

8. The document processing device according to claim 1, wherein the operations further comprise using, as one of the plurality of classification processes, a process of converting characters in the two or more documents to numerical values through a prescribed function and obtaining an occurrence count of each numerical value to classify the two or more documents based on a distribution of the occurrence counts.

9. A method of controlling a document processing device, the method comprising:

sequentially applying, by a processor, a plurality of classification processes, which are different classification processes from each other, in a prescribed sequence to a plurality of documents to classify the plurality of documents into a plurality of groups;

every time one of the plurality of classification processes is applied, determining, by the processor, whether or not each group contains two or more documents; and after applying a preceding one of the plurality of classification processes, applying, by the processor, a succeeding one of the plurality of classification processes, which has not been applied as the preceding one of the plurality of classification processes, to the two or more documents in each group determined as containing the two or more documents, wherein the prescribed sequence is a sequence in which the plurality of classification processes are applied in an ascending order of amounts of calculations by the processor if executing respective ones of the plurality of classification processes.

10. A non-transitory computer-readable recording medium containing a control program that, if executed, causes a processor to execute a document processing method comprising:

sequentially applying, by the processor, a plurality of classification processes, which are different classification processes from each other, in a prescribed sequence, to a plurality of documents to classify the plurality of documents into a plurality of groups;

every time one of the plurality of classification processes is applied, determining, by the processor, whether or not each group contains two or more documents; and after applying a preceding one of the plurality of classification processes, applying, by the processor, a succeeding one of the plurality of classification processes, which has not been applied as the preceding one of the plurality of classification processes, to the two or more documents in each group determined as containing the two or more documents, wherein the prescribed sequence is a sequence in which the plurality of classification processes are applied in an ascending order of amounts of calculations by the processor if executing respective ones of the plurality of classification processes.

* * * * *